(12) United States Patent
Shiozaki et al.

(10) Patent No.: US 6,483,955 B2
(45) Date of Patent: Nov. 19, 2002

(54) DIFFRACTION GRATING DEVICE

(75) Inventors: Manabu Shiozaki; Toru Iwashima; Masakazu Shigehara; Kiyotaka Murashima, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/799,354

(22) Filed: Mar. 6, 2001

(65) Prior Publication Data

US 2001/0048789 A1 Dec. 6, 2001

(30) Foreign Application Priority Data

Mar. 24, 2000 (JP) ........................................ 2000-085182

(51) Int. Cl.$^7$ ............................................... G02F 1/295
(52) U.S. Cl. ................................ 385/10; 385/37; 385/1; 385/3
(58) Field of Search ............................. 385/10, 37, 12, 385/1, 3, 4, 123, 124

(56) References Cited

FOREIGN PATENT DOCUMENTS

JP 09222522 A 8/1997

OTHER PUBLICATIONS

"Spectral Behavior Analysis of Chirped Fibre Bragg Gratings for Optical Dispersion Compensation", S. Bonino et al., ECOC 97, Sep. 22–25, 1997, Conference Publication No. 448, pp. 194–197.

*Primary Examiner*—Phan T. H. Palmer
(74) *Attorney, Agent, or Firm*—McDermott, Will & Emery

(57) ABSTRACT

This invention relates to a diffraction grating device having a refractive index modulation formed in an optical waveguide region in a predetermined region in the longitudinal direction of the optical waveguide. In the diffraction grating device, a refractive index modulation is formed in the core region in a predetermined region in the longitudinal direction of the optical waveguide. In this diffraction grating device, the optical period of the refractive index modulation is substantially constant, the phase of the refractive index modulation is inverted at a phase inversion portion, and the number of phase inversion portions is one or two. In this diffraction grating device, the absolute value of a parameter R (equation (22a)) is smaller than 0.25. According to this invention, a diffraction grating device capable of shortening the region where the refractive index modulation is formed and flattening the reflectance characteristic in the reflection wavelength band is provided.

5 Claims, 13 Drawing Sheets

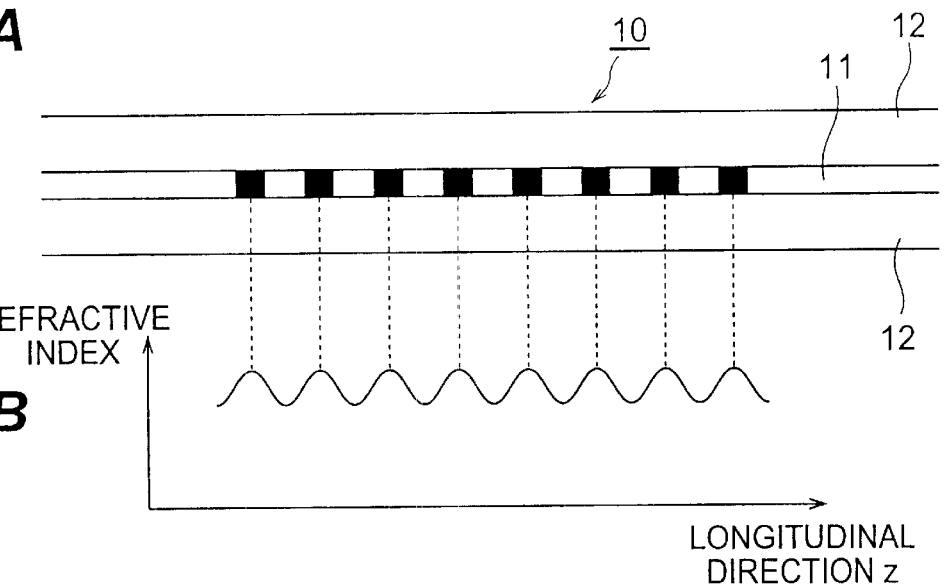
Fig.1A
Fig.1B
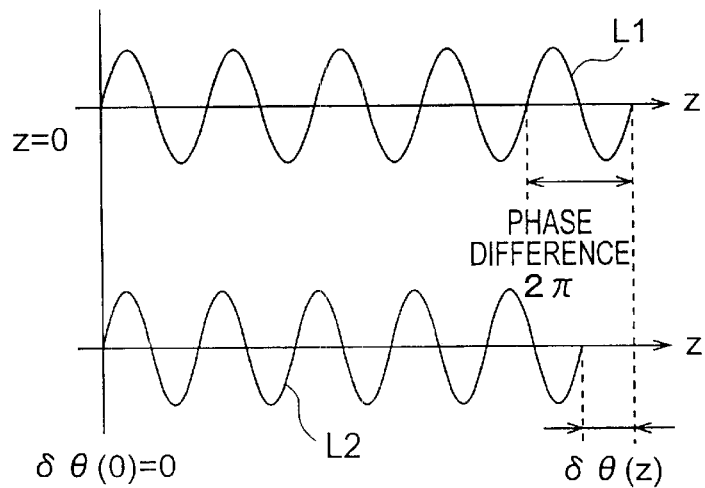
Fig.2

DIFFRACTION GRATING DEVICE

BACKGROUND OF THE INVENTION

1. Field of the Invention

The present invention relates to a diffraction grating device having a refractive index modulation formed in an optical waveguide region in a predetermined region in the longitudinal direction of an optical waveguide.

2. Related Background Art

A diffraction grating device has a refractive index modulation formed in an optical waveguide region (at least a core region) in a predetermined region in the longitudinal direction of an optical waveguide (optical fiber or planar optical waveguide). Such a diffraction grating device can selectively diffract and reflect light having a wavelength corresponding to the period of the refractive index modulation and is used as an optical filer or the like. In this diffraction grating device, preferably, the reflectance is constant in the reflection wavelength band, the reflectance is almost zero in the transmission wavelength band, and the reflectance abruptly changes near the boundary between the reflection wavelength band and the transmission wavelength band. That is, the reflection spectrum of the diffraction grating device is preferably almost rectangular as much as possible.

Generally, when the reflectance in the reflection wavelength band is almost 100%, even a diffraction grating device having a normal refractive index modulation with a uniform optical period (=average refractive index×period) and uniform amplitude can have a reflection spectrum close to a rectangle. However, when the reflectance in the reflection wavelength band is low, the reflection spectrum of a diffraction grating device indicates no constant reflectance but a reflectance represented by a quadratic function in the reflection wavelength band. A diffraction grating device that aims at obtaining a constant reflectance even when the reflectance in the reflection wavelength band is low has been proposed.

For example, a diffraction grating device described in reference 1 "Japanese Patent Laid-Open No. 9-222522" aims at obtaining a constant reflectance even at a low reflectance in the reflection wavelength band by defining as a sinc function an envelope representing the amplitude distribution of the refractive index modulation in the longitudinal direction and by inverting the phase of the refractive index modulation at the phase inversion portion. A diffraction grating device described in reference 2 "S. Bonino, et al., "Spectral Behavior Analysis of Chirped Fibre Bragg Gratings for Optical Dispersion Compensation", ECOC '97 (1997)" aims at obtaining a constant reflectance even at a low reflectance in the reflection wavelength band by defining as a tanh function a refractive index modulation amplitude distribution and by changing the period of the refractive index modulation in the longitudinal direction.

SUMMARY OF THE INVENTION

The present inventors examined the prior arts and found the following problem. For the diffraction grating device described in reference 1, let L be the optical distance (=average refractive index×geometrical distance) between two adjacent phase inversion portions, and $\lambda_B$ be the central diffraction wavelength. On the basis of the coupled wave theory, a bandwidth $\Delta\lambda$ of the reflection spectrum is approximately given by $$\Delta\lambda = \lambda_B^2 / 2 L_S \tag{6}$$

For example, when $\Delta\lambda = 0.2$ nm and $\lambda_B = 1.55$ μm, $L_S = 6.0$ mm. To make the reflection spectrum closer to a rectangular shape, the length of the region where the refractive index modulation is formed must be increased. For example, when the length of the region where the refravtive index modulation is formed is $20L_S$, the optical distance is as long as 120 mm. In the diffraction grating device described in reference 2, when the bandwidth $\Delta\lambda$ of the reflection spectrum is 0.4 nm, the length of the region where the refractive index modulation is formed is as long as 100 mm. As described above, in the diffraction grating devices described in references 1 and 2, the region where the refractive index modulation is formed inevitably becomes long.

To maintain a constant reflection spectrum for a diffraction grating device, the temperature of the diffraction grating device must be kept constant using a Peltier device or the like, or temperature compensation must be done by applying a tension to the diffraction grating device using a member having a thermal expansion coefficient different from that of the diffraction grating device. However, when the region where the refractive index modulation is formed is long, assembly for temperature adjustment or tension application is difficult, and the reflection spectrum of the diffraction grating device can hardly be kept constant when the temperature varies.

The diffraction grating device described in reference 1 aims at obtaining a constant reflectance even at a low reflectance in the reflection wavelength band. However, even when the length of the region where the refractive index modulation is formed is set to $20L_S$, the deviation in reflectance in the reflection wavelength band is as large as about 20%.

The present invention has been made to solve the above problems, and has as its object to provide a diffraction grating device which can shorten the region where the refractive index modulation is formed, and flatten the reflectance characteristic in the reflection wavelength band.

A diffraction grating device according to the present invention is a diffraction grating device having a refractive index modulation formed in an optical waveguide region in a predetermined region in a longitudinal direction of an optical waveguide. In this diffraction grating device, the optical period of the refractive index modulation is substantially constant, the phase of the refractive index modulation is inverted at a phase inversion portion, and the number of phase inversion portions present in the predetermined region is one or two. When z is a variable representing a position in the longitudinal direction using a barycentric position of the predetermined region as an origin, that is, z is an optical distance from the origin, $\Delta n(z)$ is the amplitude distribution of the refractive index modulation, and the sign of the amplitude distribution $\Delta n(z)$ is changed at the phase inversion portion, parameters $A_0$, $A_2$, $B_0$, and $B_2$ obtained by integral calculations in the predetermined region are given by $$A_0 = \int \Delta n(z) dz \tag{7a}$$

$$A_2 = \int z^2 \cdot \Delta n(z) dz \tag{7b}$$

$$B_0 = \int |\Delta n(z)| dz \tag{7c}$$

$$B_2 = \int z^2 \cdot |\Delta n(z)| dz \tag{7d}$$

and for the parameters $A_0$, $A_2$, $B_0$, and $B_2$, a condition given by $$\left|\frac{A_2 \cdot B_0}{A_0 \cdot B_2}\right| < 0.25 \tag{8}$$

holds.

The diffraction grating device according to the present invention, which satisfies the above conditions, can shorten the region where the refractive index modulation is formed and flatten the reflectance characteristic in the reflection wavelength band. Hence, in this diffraction grating device, assembly for temperature adjustment or tension application is easy, and the reflection spectrum of the diffraction grating device can easily be kept constant when the temperature varies.

The diffraction grating device according to the present invention may be characterized in that the amplitude distribution $\Delta n(z)$ of the refractive index modulation is 0 at the phase inversion portion. In this case, the side lobe in the transmission wavelength band can be reduced while maintaining the flat reflectance characterisitic in the reflection wavelength band.

The diffraction grating device according to the present invention may be characterized in that an average refractive index is constant in the predetermined region, and the amplitude distribution $\Delta n(z)$ of the refractive index modulation is represented by a cos function. In this case, the diffraction grating device can easily be manufactured using two types of normal phase grating masks each having a periodically three-dimensional surface.

A diffraction grating device according to the present invention is a diffraction grating device having a refractive index modulation formed in an optical waveguide region in a predetermined region in a longitudinal direction of an optical waveguide. When z is a variable representing a position in the longitudinal direction using a central position of the predetermined region as an origin, that is, z is an optical distance from the origin, $\Delta n(z)$ is the amplitude distribution of the refractive index modulation, and $\delta\theta(z)$ is the phase shift distribution of the refractive index modulation with reference to a period defined from a central diffraction wavelength, the amplitude distribution $\Delta n(z)$ of the refractive index modulation is represented by an even function, the phase shift distribution $\delta\theta(z)$ of the refractive index modulation is represented by an even and continuous function, and parameters $A_{0C}$, $A_{0S}$, $A_{2C}$, $A_{2S}$, $B_0$, and $B_2$ obtained by integral calculations in the predetermined region are given by $$A_{0C} = \int \Delta n(z) \cdot \cos(\delta\theta(z)) dz \tag{9a}$$

$$A_{0S} = \int \Delta n(z) \cdot \sin(\delta\theta(z)) dz \tag{9b}$$

$$A_{2C} = \int z^2 \cdot \Delta n(z) \cdot \cos(\delta\theta(z)) dz \tag{9c}$$

$$A_{2S} = \int z^2 \cdot \Delta n(z) \cdot \sin(\delta\theta(z)) dz \tag{9d}$$

$$B_0 \int \Delta n(z) dz \tag{9e}$$

$$B_2 = \int z^2 \cdot \Delta n(z) dz \tag{9f}$$

for the parameters $A_{0C}$, $A_{0S}$, $A_{2C}$, $A_{2S}$, $B_0$, and $B_2$, a condition given by $$\left|\frac{(A_{0c} \cdot A_{2c} + A_{0s} \cdot A_{2s}) \cdot B_0}{(A_{0c}^2 + A_{0s}^2) \cdot B_2}\right| < 0.25 \tag{10}$$

holds, and a condition given by $$|\delta\theta(z) - \delta\theta(0)| < 2\pi \tag{11}$$

holds in the predetermined region.

The diffraction grating device according to the present invention, which satisfies the above conditions, can also shorten the region where the refractive index modulation is formed and flatten the reflectance characteristic in the reflection wavelength band. Hence, in this diffraction grating device, assembly for temperature adjustment or tension application is easy, and the reflection spectrum of the diffraction grating device can easily be kept constant when the temperature varies.

The diffraction grating device according to the present invention may be characterized in that the amplitude distribution $\Delta n(z)$ of the refractive index modulation has two minimal points of absolute value in the predetermined region. In this case, the change in reflectance can be made steep near the boundary between the reflection wavelength band and the transmission wavelength band.

The present invention can be readily understood from the following detailed description taken in conjunction with the accompanying drawings. These drawings are merely examples and do not limit the present invention.

BRIEF DESCRIPTION OF THE DRAWINGS

FIGS. 1A and 1B are explanatory views of a diffraction grating device and, more specifically, FIG. 1A is a sectional view showing a diffraction grating device taken along a plane including an optical axis, and FIG. 1B is a view schematically showing the longitudinal refractive index distribution of the diffraction grating device;

FIG. 2 is an explanatory view of the phase shift distribution $\delta\theta(z)$ of the refractive index modulation of the diffraction grating device;

FIGS. 11A, 12A, 13A, and 14A show the amplitude distributions Δn(z) of the refractive index modulations, FIGS. 11B, 12B, 13B, and 14B show diffraction wavelength shift distributions $\delta\lambda_B(z)$ from the central diffraction wavelength $\lambda_B$, and FIGS. 11C, 12C, 13C, and 14C show the reflection spectra;

FIG. 15A shows a phase grating mask, and FIG. 15B shows the amplitude of the refractive index of the diffraction grating device;

FIG. 16A shows the amplitude distribution Δn(z) of the refractive index modulation, FIG. 16B shows the diffraction wavelength shift distribution $\delta\lambda_b(z)$ from the central diffraction wavelength $\lambda_B$, FIG. 16C shows the reflection spectrum, and FIG. 16D shows the reflection spectrum when the phase change amount is set to π in the region of a phase inversion portion; FIGS. 17A, 18A, and 19A show the amplitude distributions Δn(z) of the refractive index modulations, FIGS. 17B, 18B, and 19B show the diffraction wavelength shift distributions $\delta\lambda_B(z)$ from the central diffraction wavelength $\lambda_B$, FIGS. 17C, 18C, and 19C show the phase shift distributions $\delta\lambda(z)$ of the refractive index modulations, and FIGS. 17D, 18D, and 19D show the reflection spectra.

DETAILED DESCRIPTION OF THE PREFERRED EMBODIMENTS

Figure 3:
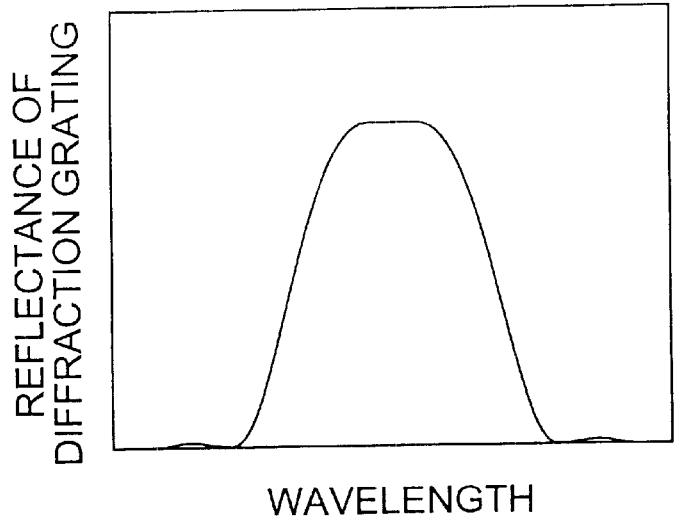
FIG. 3 is a graph showing the reflection spectrum of a diffraction grating device whose amplitude distribution $\Delta n(z)$ of the refractive index modulation is represented by a sinc function.

Embodiments of the present invention will be described below in detail with reference to the accompanying drawings. The same reference numerals denote the same elements throughout the drawings, and a repetitive description will be omitted.

First, details of analysis that has led to a diffraction grating device according to the present invention will be described. FIGS. 1A and 1B are explanatory views of a diffraction grating device 10. More specifically, FIG. 1A is a sectional view showing the diffraction grating device 10 taken along a plane including an optical axis, and FIG. 1B is a view showing the longitudinal refractive index distribution of the diffraction grating device 10. For this diffraction grating device 10, in a predetermined region in the longitudinal direction of an optical fiber (optical waveguide) having a core region 11 and cladding region 12, a refractive index modulation is formed in the core region 11 (optical waveguide region). In the core region 11 shown in FIG. 1A, a solid portion represents a portion where the refractive index is high. To manufacture such a diffraction grating device, interference fringes are formed on an optical fiber based on silica glass and having a core region doped with $GeO_2$ by irradiating the optical fiber with UV light through a phase grating mask, and a refractive index distribution is formed in correspondence with the intensity distribution of the interference fringes.

Let z be a variable representing the optical distance in the longitudinal direction of the diffraction grating device along the light propagation direction, $n_0(z)$ be the longitudinal distribution of the average refractive index of the refractive index modulation formed in the diffraction grating device, and $\lambda_B$ be the central diffraction wavelength of the diffraction grating device. On the basis of the Bragg condition, a reference period $\Lambda_0(z)$ of the refractive index modulation formed in the diffraction grating device in accordance with the central diffraction wavelength $\lambda_B$ is given by $$\Lambda_0(z) = \frac{\lambda_B}{2 \cdot n_0(z)} \tag{12}$$

With reference to the period $\Lambda_0(z)$ defined from the central diffraction wavelength $\lambda_B$, as indicated by L1 in FIG. 2, the phase shift distribution of the refractive index modulation of the diffraction grating device is represented by $\delta\theta(z)$, as indicated by L2 in FIG. 2.

For a diffraction grating device having a low reflectance in the reflection wavelength band, let Δn(z) be the amplitude distribution of the refractive index modulation. In this case, a complex reflectance r of light having a wavelength $\lambda_B+\Delta\lambda$ is given by $$r(\zeta) = A \int \Delta n(z) \cdot \exp(i \cdot \zeta - i \cdot \delta\theta(z)) dz \tag{13a}$$

$$\zeta = -\frac{4\pi \cdot \Delta\lambda}{\lambda_B^2} \tag{13b}$$

This integration is done for the region where the refractive index modulation is formed. A is a constant. Taylor expansion of equation (13a) centered on ζ=0 yields an approximate expression given by $$r(\zeta) = A \int \Delta n(z) \cdot \exp(-i \cdot \delta\theta(z)) \cdot (1 + i \cdot \zeta - \zeta^2 \cdot z^2/2) dz \tag{14}$$

When equation (14) is arranged until the term of second order of ζ, we obtain $$|r(\zeta)|^2 = A^2 \cdot \{A_{0C}^2 + A_{0S}^2 + 2(A_{0C} \cdot A_{1S} - A_{0S} \cdot A_{1C})\zeta + (A_{1C}^2 + A_{1S}^2 - A_{0C} \cdot A_{2C} - A_{0S} \cdot A_{2S})\zeta^2\} \tag{15}$$

Parameters $A_{0C}$, $A_{0S}$, $A_{1C}$, $A_{1S}$, $A_{2C}$, and $A_{2S}$ are given by $$A_{0C} = \int \Delta n(z) \cdot \cos(\delta\theta(z)) dz \tag{16a}$$

$$A_{0S} = \int \Delta n(z) \cdot \sin(\delta\theta(z)) dz \tag{16b}$$

$$A_{1C} = \int z \cdot \Delta n(z) \cdot \cos(\delta\theta(z)) dz \tag{16c}$$

$$A_{1S} = \int z \cdot \Delta n(z) \cdot \sin(\delta\theta(z)) dz \tag{16d}$$

$$A_{2C} = \int z^2 \cdot \Delta n(z) \cdot \cos(\delta\theta(z)) dz \tag{16e}$$

$$A_{2S} = \int z^2 \cdot \Delta n(z) \cdot \sin(\delta\theta(z)) dz \tag{16f}$$

To flatten the reflection spectrum of the diffraction grating device at the central diffraction wavelength $\lambda_B$, the linear differential (inclination) and quadratic differential (curvature) related to ζ in equation (15) when ζ=0 are set to 0. That is, relations given by $$A_{0C} \cdot A_{1S} - A_{0S} \cdot A_{1C} = 0 \tag{17a}$$

$$A_{1C}^2 + A_{1S}^2 - A_{0C} \cdot A_{2C} - A_{0S} \cdot A_{2S} = 0 \tag{17b}$$

are satisfied.

In a normal diffraction grating device having a refractive index modulation period matching the period $\Lambda_0(z)$ defined from the central diffraction wavelength $\lambda_B$, the phase shift distribution $\delta\theta(z)$ of the refractive index modulation is always 0. In this case, a relation given by $$A_{0S} = A_{1S} = A_{2S} = 0 \tag{18}$$

holds, and therefore, equation (17a) always holds. However, since the amplitude distribution $\Delta n(z)$ of the refractive index modulation is larger than 0, and the parameters $A_{0C}$ and $A_{2C}$ are larger than 0, equation (17b) cannot hold.

The present inventors examined various conditions for a diffraction grating device for which both equations (17a) and (17b) can hold. The present inventors found by this examination that when the phase of the refractive index modulation is inverted at a phase inversion portion, and a predetermined condition is satisfied, or when each of the amplitude distribution $\Delta n(z)$ and phase shift distribution $\delta\theta(z)$ of the refractive index modulation is an even function (symmetrical with respect to the central position), and a predetermined condition is satisfied, both equations (17a) and (17b) can hold. The present invention has been made on the basis of the above analysis. Embodiments of the diffraction grating device according to the present invention will be described below.

First Embodiment

A diffraction grating device according to the first embodiment of the present invention will be described next. In the diffraction grating device according to the first embodiment, the phase of the refractive index modulation is inverted at a phase inversion portion.

In this embodiment, since the phase shift distribution $\delta\theta(z)$ of the refractive index modulation is 0 or $\pi$, equation (18) is always satisfied, and equation (17a) is also always satisfied. Hence, equation (17b) is made to hold.

To simplify the following equations, parameters $A_0$, $A_1$, and $A_2$ given by $$A_0 = \int \Delta n(z) dz \tag{19a}$$

$$A_1 = \int z \cdot \Delta n(z) dz \tag{19b}$$

$$A_2 = \int z^2 \cdot \Delta n(z) dz \tag{19c}$$

are used in place of parameters $A_{0C}$, $A_{1C}$, and $A_{2C}$. The amplitude distribution $\Delta n(z)$ of the refractive index modulation has a positive value in a section where $\delta\theta(z)=0$ and a negative value in a section where the phase is inverted, and $\delta\theta(z)=\pi$. The parameter $A_1/A_0$ represents the barycentric position of the amplitude distribution $\Delta n(z)$ of the refractive index modulation. This barycentric position is defined as the origin of a variable z, and the parameter $A_1$ is set to 0. At this time, equation (15) can be rewritten to $$|r(\zeta)|^2 = A^2 \cdot \{A_0^2 - A_0 \cdot A_2 \cdot \zeta^2\} \tag{20}$$

To satisfy equation (17b), the coefficient of the second term of equation (20) must be 0, i.e., $$A^2 \cdot A_0 \cdot A_2 = 0 \tag{b 21}$$

must be satisfied. Since the constant $A^2 \cdot A_0^2$ of the first term of equation (20) represents the reflectance of the diffraction grating device at the central diffraction wavelength $\lambda_B$, the parameter A or $A_0$ cannot be 0, and the parameter $A_2$ must be 0. With the expression of equation (21), the curvature of the reflection spectrum changes depending on the reflectance or reflection wavelength bandwidth.

The coefficient (curvature) of the second term of equation (20) is divided by the constant (reflectance at the central diffraction wavelength $\lambda_B$) of the first term of equation (20) and thus normalized. The quotient $(A_2/A_0)$ is defined as a normalized curvature. The normalized curvature $(A_2/A_0)$ when a phase inversion portion is present is divided by a normalized curvature $(B_2/B_0)$ when no phase inversion portion is present and thus normalized. This quotient is represented by a parameter R. That is, the parameter R is given by $$R = \frac{A_2 \cdot B_0}{A_0 \cdot B_2} \tag{22a}$$

$$B_0 = \int |\Delta n(z)| dz \tag{22b}$$

$$B_2 = \int z^2 \cdot |\Delta n(z)| dz \tag{22c}$$

Evaluation will be done below using the parameter R.

The amplitude distribution $\Delta n(z)$ of the refractive index modulation is represented by a sinc function and given by $$\Delta n(z) = \Delta n_0 \cdot \mathrm{sinc}\left(\frac{\pi \cdot z}{L_S}\right) \tag{23}$$

where $L_S$ is the optical distance (=average refractive index × geometrical distance) between two adjacent phase inversion portions. When the refractive index modulation of the diffraction grating device is symmetrical with respect to the origin (z=0), the barycentric position of the amplitude distribution $\Delta n(z)$ of the refractive index modulation matches the origin, and the parameter $A_1$ is 0. The coefficient $\Delta n_0$ in equation (23) is sufficiently small, and the reflectance is low. Let $L_g$ be the longitudinal optical length (=average refractive index × geometrical length) of the region where the refractive index modulation is formed in the diffraction grating device. To allow the amplitude distribution $\Delta n(z)$ of the refractive index modulation, which is represented by equation (23), to satisfy equation (21), a relation given by $$L_g/L_S = 2.861,\ 4.918,\ 6.942,\ 8.955, \tag{24}$$

needs to be satisfied.

Figure 4:
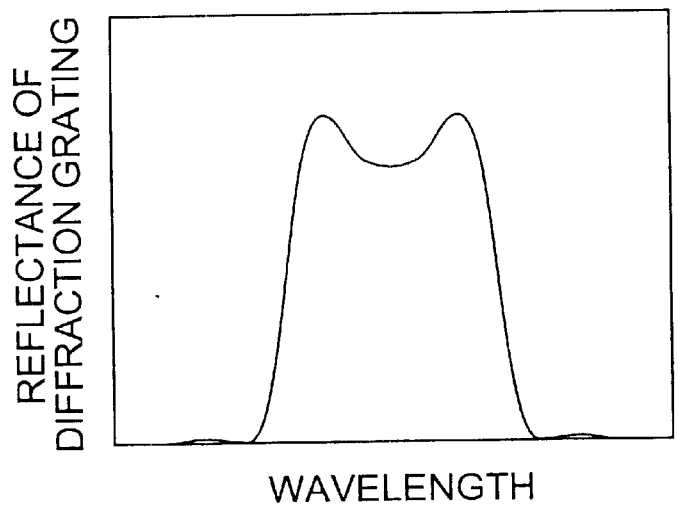
FIG. 4 is a graph showing the reflection spectrum of a diffraction grating device whose amplitude distribution $\Delta n(z)$ of the refractive index modulation is represented by a sinc function.
Figure 5:
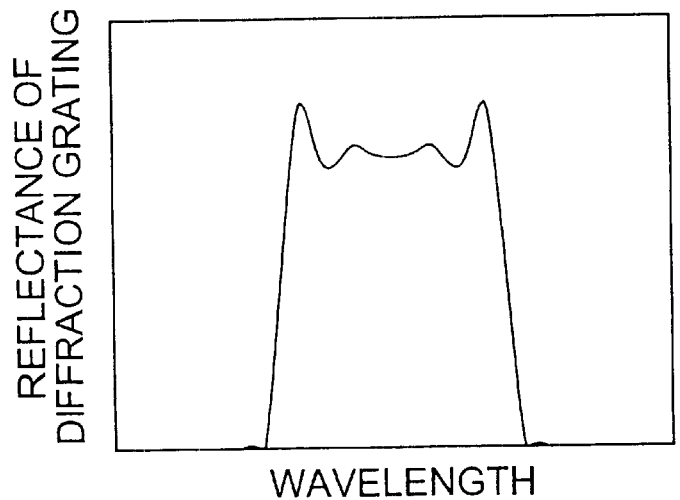
FIG. 5 is a graph showing the reflection spectrum of a diffraction grating device whose amplitude distribution $\Delta n(z)$ of the refractive index modulation is represented by a sinc function.
Figure 6:
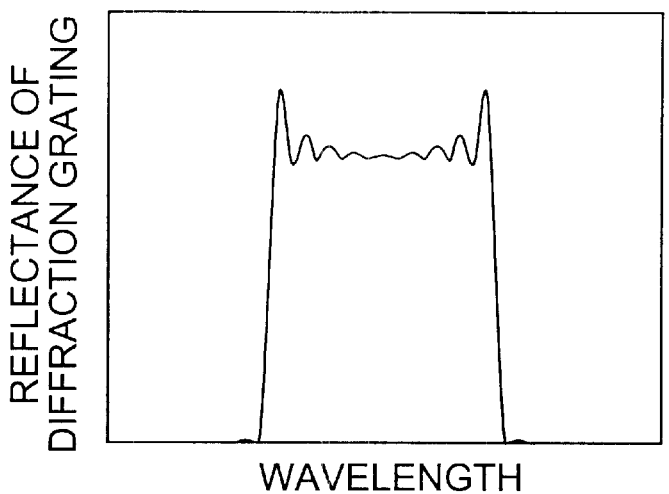
FIG. 6 is a graph showing the reflection spectrum of a diffraction grating device whose amplitude distribution $\Delta n(z)$ of the refractive index modulation is represented by a sinc function.

FIGS. 3 to 6 are graphs showing the reflection spectra of diffraction grating devices whose amplitude distribution $\Delta n(z)$ of the refractive index modulation is represented by a sinc function. FIG. 3 shows a reflection spectrum when $L_g/L_S=2.861$ (when two phase inversion portions are present). FIG. 4 shows a reflection spectrum when $L_g/L_{SS}=4.918$ (when four phase inversion portions are present). FIG. 5 shows a reflection spectrum when $L_g/L_S=6.942$ (when six phase inversion portions are present). FIG. 6 shows a reflection spectrum when $L_g/L_S=8.955$ (when eight phase inversion portions are present).

As is apparent from FIGS. 3 to 6, in either case, the reflection spectrum is almost flat at the central diffraction wavelength $\lambda_B$. When the longitudinal optical length $L_g$ of the region where the refractive index modulation is formed is increased, the reflectance abruptly changes near the boundary between the reflection wavelength band and the transmission wavelength band. However, when the optical length $L_g$ is increased, the reflectance becomes high near the both ends in the reflection wavelength band, and the flatness of reflection spectrum in the reflection wavelength band is lost. For the diffraction grating device, when $L_g/L_s=2.861$, i.e., when two phase inversion portions are formed, the length of the region where the refractive index modulation is formed can be reduced, and the reflectance in the reflection wavelength band can be flattened.

In the above case, the coefficient $\Delta n_0$ in equation (23) is sufficiently small. The influence of the coefficient $\Delta n_0$ in a diffraction grating device whose amplitude distribution $\Delta n(z)$ of the refractive index modulation is represented by a sinc function will be examined next. If the reflectance at the central diffraction wavelength $\lambda_B$ is almost 100%, the reflectance characteristic in the reflection wavelength band becomes almost flat because the reflectance cannot exceed 100%. The reflectance at the central diffraction wavelength $\lambda_B$ was set to be about 3% and about 80%, and the longitudinal optical length $L_g$ of the region with the refractive index modulation was changed. The relationship between the parameter R (equation (22a)) and the normalized curvature of the actual reflection spectrum at the central diffraction wavelength $\lambda_B$ and the relationship between the parameter R and a wavelength bandwidth at which a reflectance of 95% or more of the maximum reflectance was obtained were examined.

Figure 7:
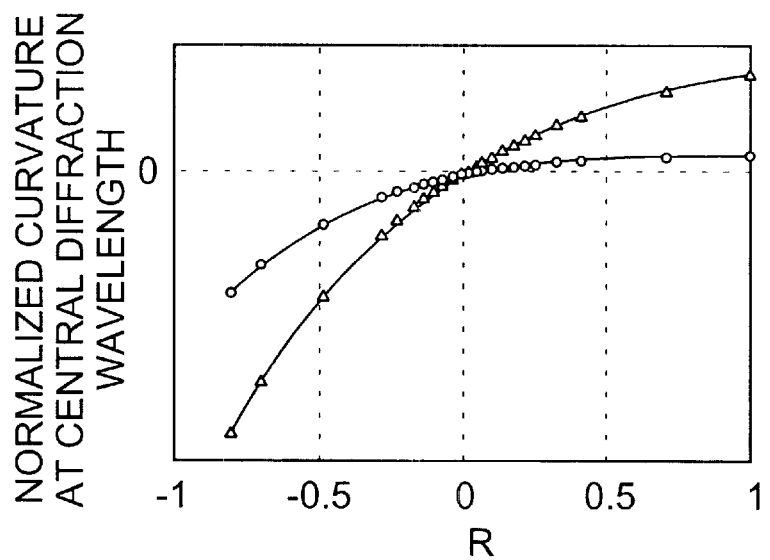
FIG. 7 is a graph showing the relationship between a parameter R and the normalized curvature of the reflection spectrum at a central diffraction wavelength $\lambda_B$.
Figure 8:
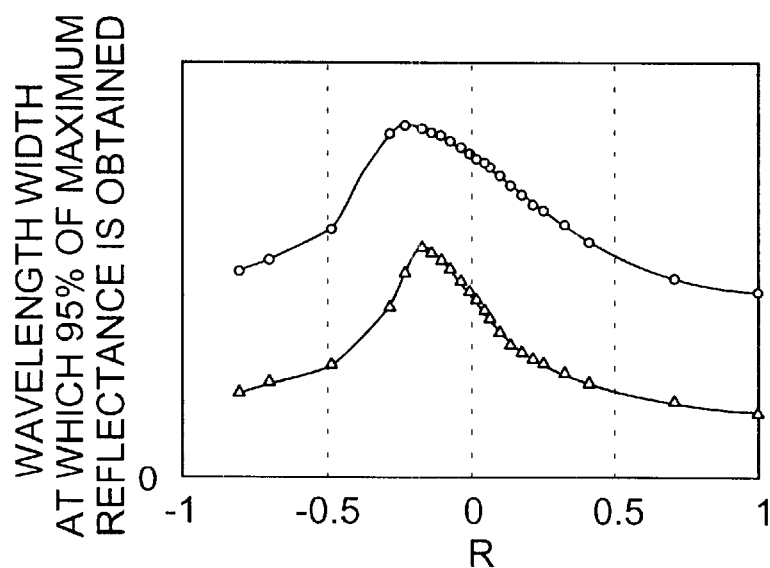
FIG. 8 is a graph showing the relationship between the parameter R and a wavelength bandwidth at which a reflectance of 95% or more of the maximum reflectance is obtained.

FIG. 7 is a graph showing the relationship between the parameter R and the normalized curvature of the reflection spectrum at the central diffraction wavelength $\lambda_B$. Referring to FIG. 7, hollow triangles indicate the case wherein the reflectance of the diffraction grating is about 3%, and hollow bullets represent the case wherein the reflectance of the diffraction grating is about 80%. As shown in FIG. 7, when the reflectance at the central diffraction wavelength $\lambda_B$ is high, the value of the parameter R at which the curvature of the reflection spectrum becomes 0 is not 0 and is shifted to the positive side. FIG. 8 is a graph showing the relationship between the parameter R and the wavelength bandwidth at which a reflectance of 95% or more of the maximum reflectance is obtained. Referring to FIG. 8, hollow triangles indicate the case wherein the reflectance of the diffraction grating is about 3%, and hollow bullets represent the case wherein the reflectance of the diffraction grating is about 80%. As shown in FIG. 8, the value of the parameter R at which the wavelength bandwidth at which a reflectance of 95% or more of the maximum reflectance is maximized is shifted to the negative side independently of the reflectance at the central diffraction wavelength $\lambda_B$. This is because when the reflection spectrum in the reflection wavelength band exhibits a concave shape with a low reflectance at the central diffraction wavelength $\lambda_B$, the reflection wavelength bandwidth increases though the flatness at the central diffraction wavelength $\lambda_B$ is slightly lost.

Figure 9:
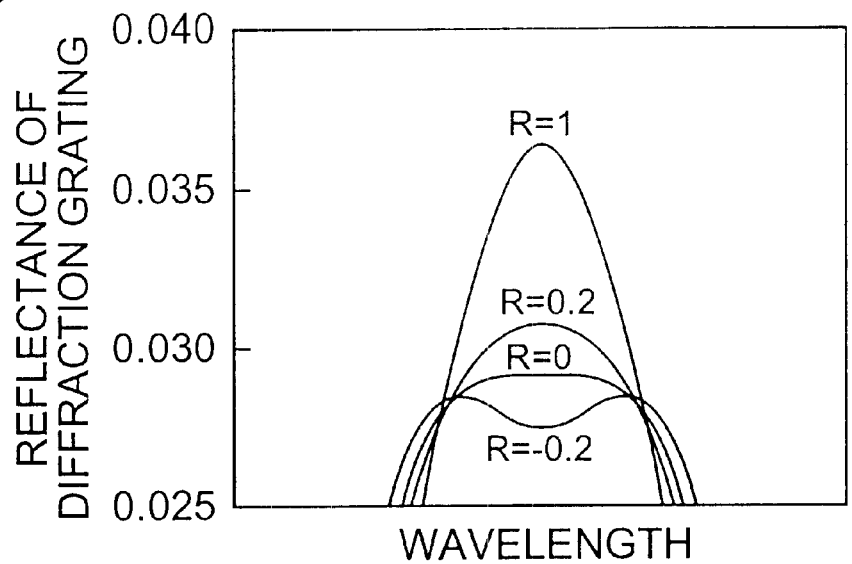
FIG. 9 is a graph showing reflection spectra at various values of the parameter R when the reflectance at the central diffraction wavelength $\lambda_B$ is about 3%.
Figure 10:
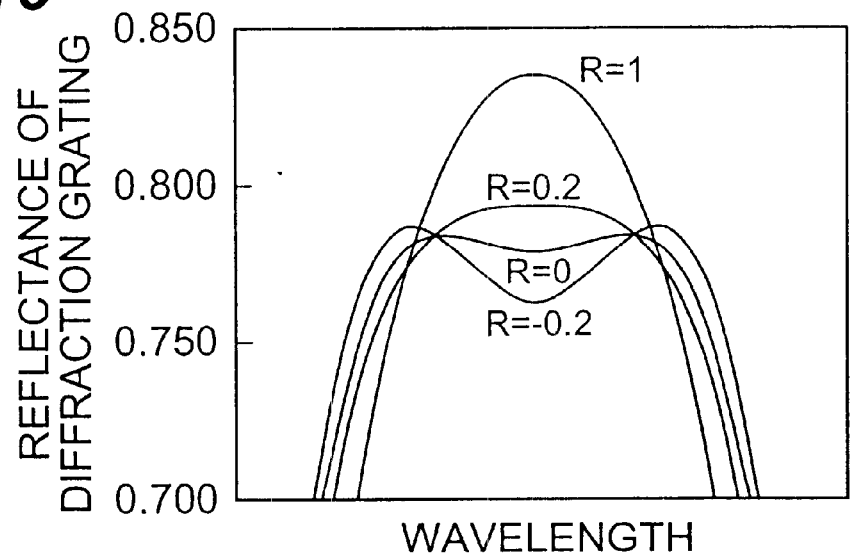
FIG. 10 is a graph showing reflection spectra at various values of the parameter R when the reflectance at the central diffraction wavelength $\lambda_B$ is about 80%.

FIG. 9 is a graph showing reflection spectra at various values of the parameter R when the reflectance at the central diffraction wavelength $\lambda_B$ is about 3%. FIG. 10 is a graph showing reflection spectra at various values of the parameter R when the reflectance at the central diffraction wavelength $\lambda_B$ is about 80%. The value of the parameter R was set to 1 (no phase inversion), 0.2, 0, and −0.2. Each graph enlarges the neighborhood of the peak of the reflection spectrum. Reflection spectra were obtained by changing the parameter R to various values other than the values in FIGS. 9 and 10. To flatten the reflectance in the reflection wavelength band, a relation given by $$|R|<0.25 \qquad (25)$$

needs to be satisfied.

A diffraction grating device whose amplitude distribution $\Delta n(z)$ of the refractive index modulation is represented by a sinc function has been described above. However, a detailed design example of the diffraction grating device according to the first embodiment is not limited to this. Detailed design examples of the diffraction grating device whose amplitude distribution $\Delta n(z)$ of the refractive index modulation is not represented by a sinc function will be described below.

Figure 11A:
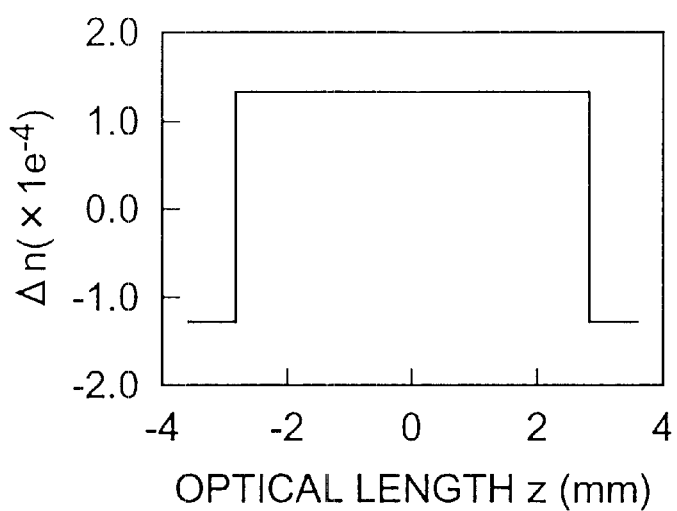
FIGS. 11A to 11C are graphs for explaining the first design example of the diffraction grating device according to the first embodiment.
Figure 11B:
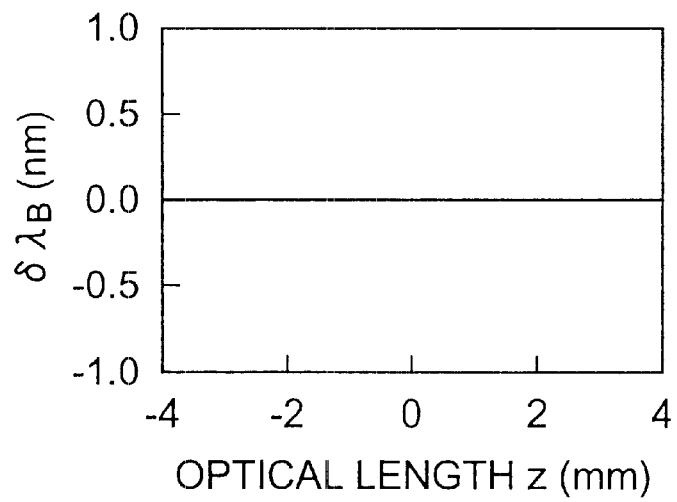
Figure 11C:
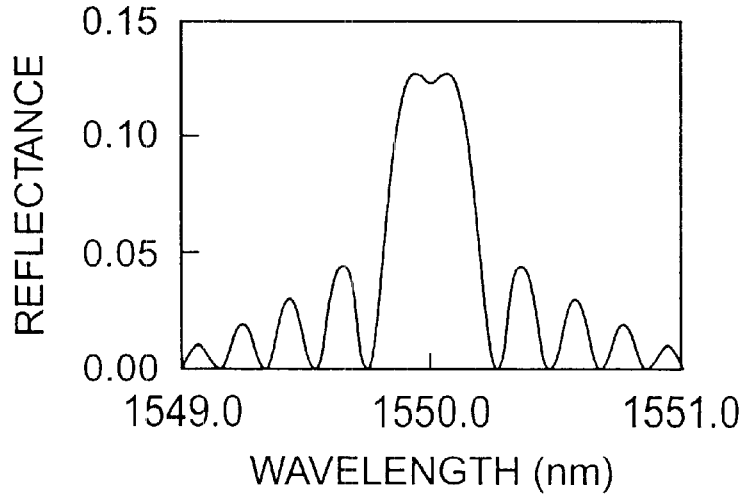
Figure 12A:
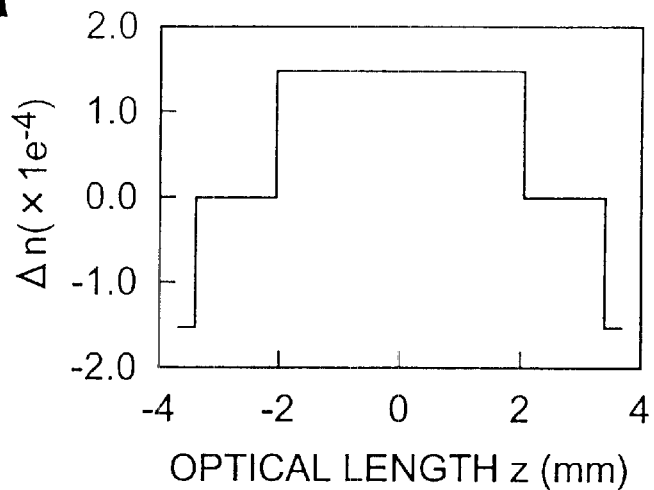
FIGS. 12A to 12C are graphs for explaining the second design example of the diffraction grating device according to the first embodiment.
Figure 12B:
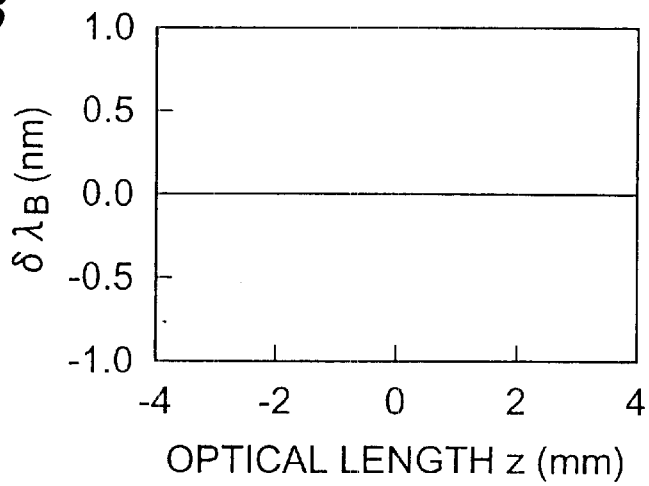
Figure 12C:
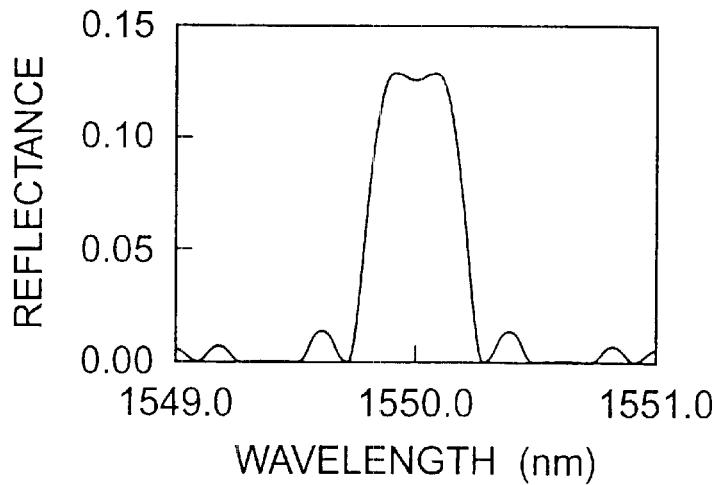
Figure 13A:
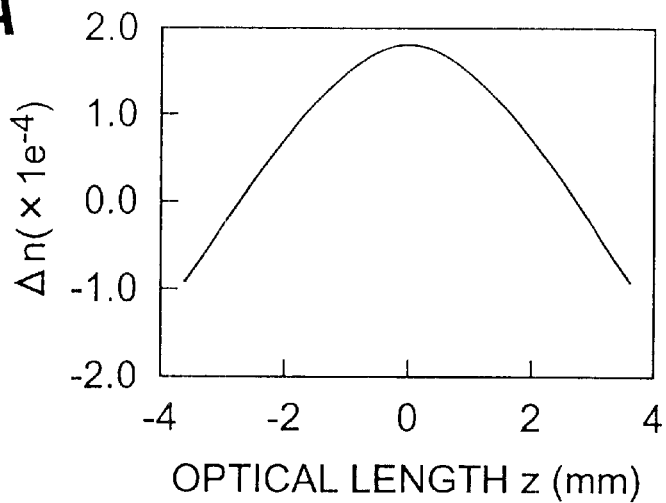
FIGS. 13A to 13C are graphs for explaining the third design example of the diffraction grating device according to the first embodiment.
Figure 13B:
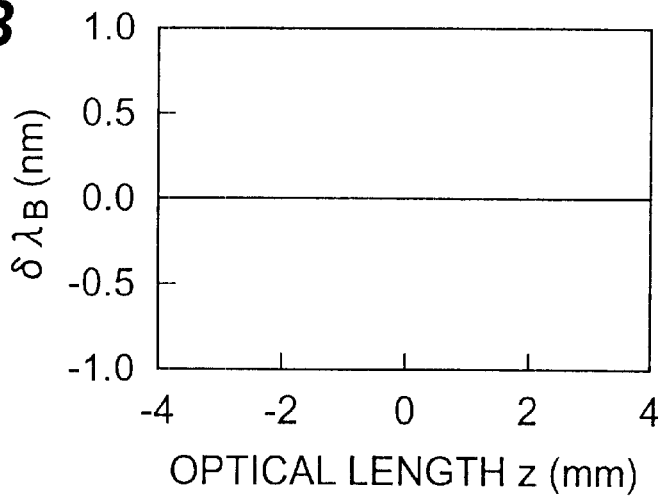
Figure 13C:
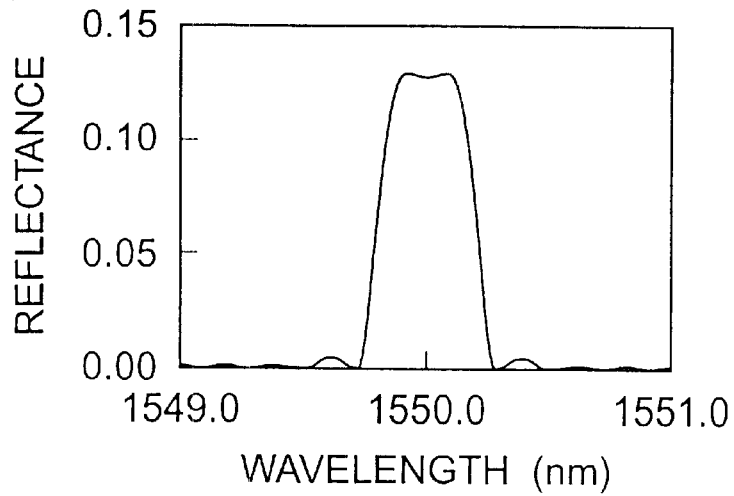
Figure 14A:
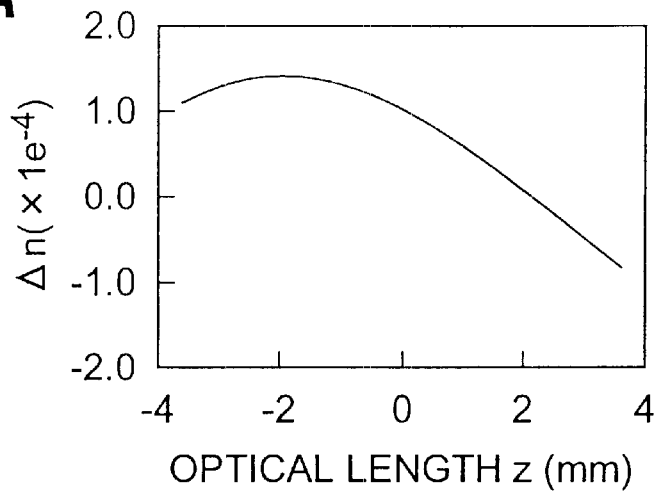
FIGS. 14A to 14C are graphs for explaining the fourth design example of the diffraction grating device according to the first embodiment and, more specifically, in the first to fourth design examples.
Figure 14B:
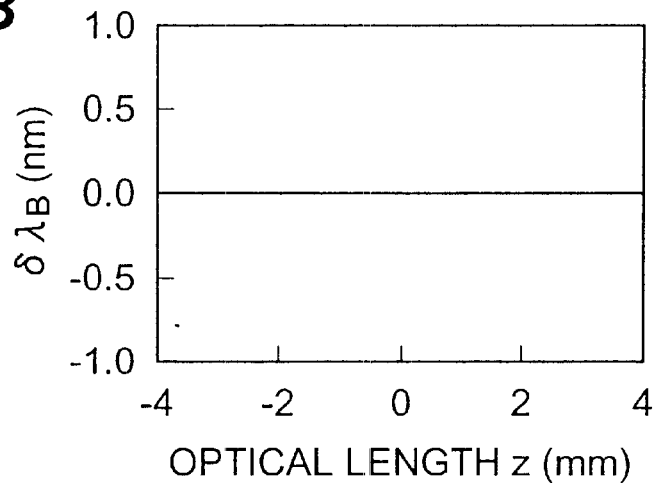
Figure 14C:
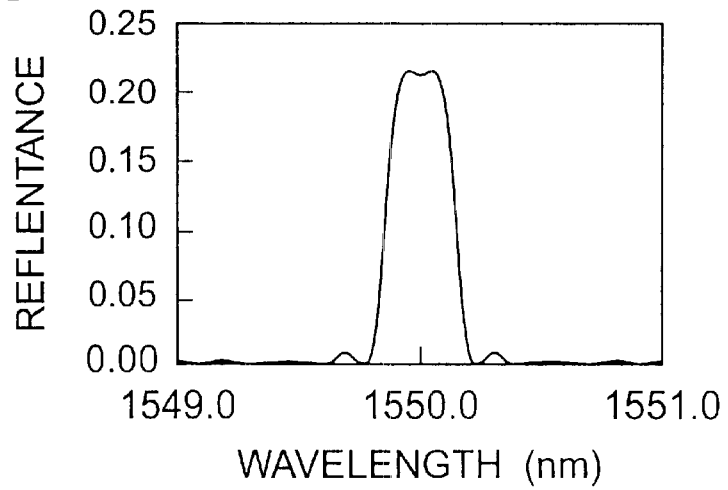

FIGS. 11A to 11C are graphs for explaining the first design example of the diffraction grating device according to this embodiment, FIGS. 12A to 12C are graphs for explaining the second design example of the diffraction grating device according to this embodiment, FIGS. 13A to 13C are graphs for explaining the third design example of the diffraction grating device according to this embodiment, and FIGS. 14A to 14C are graphs for explaining the fourth design example of the diffraction grating device according to this embodiment. FIGS. 11A, 12A, 13A, and 14A show the amplitude distributions $\Delta n(z)$ of the refractive index modulations, FIGS. 11B, 12B, 13B, and 14B show diffraction wavelength shift distributions $\delta\lambda_B(z)$ from the central diffraction wavelength $\lambda_B$, and FIGS. 11C, 12C, 13C, and 14C show the reflection spectra. The diffraction wavelength shift distribution $\delta\lambda_B(z)$ from the central diffraction wavelength $\lambda_B$ is given by $$\delta\lambda_B(z)=n_0(z)\cdot\Lambda(z)-\lambda_B \qquad (26)$$

where $n_0(z)$ is the average refractive index distribution, and $\Lambda(z)$ is the refractive index modulation period distribution. As shown in FIGS. 11C, 12C, 13C, and 14C, for the diffraction grating device of each design example, the reflectance characteristic is almost flat in the reflection wavelength band. Additionally, since the reflection spectrum has a concave shape with a low reflectance at the central diffraction wavelength $\lambda_B$, the reflection wavelength bandwidth becomes wide.

In the first to fourth design examples, the average refractive index distribution $n_0(z)$ has a constant value of 1.46, the central diffraction wavelength $\lambda_B$ is 1.55 μm, the geometrical length of the region where the refractive index modulation is formed is 5 mm, and therefore, the optical length of the region where the refractive index modulation is formed is 7.3 mm. In the first to fourth design examples, the diffraction wavelength shift distribution $\delta\lambda_B(z)$ from the central diffraction wavelength $\lambda_B$ has a constant value of 0 (FIGS. 11B, 12B, 13B, and 14B). That is, the period $\Lambda(z)$ of the refractive index modulation matches the reference period $\Lambda_0(z)$, and the optical period $n_0(z)\cdot\Lambda(z)$ is constant.

Each of the diffraction grating devices of the first to third design examples have a symmetrical amplitude distribution $\Delta n(z)$ of the refractive index modulation and two phase inversion portions. The diffraction grating device of the fourth design example has an asymmetrical amplitude distribution $\Delta n(z)$ of the refractive index modulation and one phase inversion portion. In the diffraction grating devices of the first and second design examples, the amplitude distribution $\Delta n(z)$ of the refractive index modulation changes stepwise. In the diffraction grating devices of the third and fourth design examples, the amplitude distribution $\Delta n(z)$ of the refractive index modulation is represented by a cos function.

In the diffraction grating device of the first design example, the amplitude distribution $\Delta n(z)$ of the refractive index modulation is not 0 at any phase inversion portion, and the sign of the amplitude distribution $\Delta n(z)$ is inverted at each phase inversion portion. In the diffraction grating device of the second design example, the amplitude distribution Δn(z) of the refractive index modulation is 0 at each phase inversion portion through a predetermined length in the longitudinal direction. In the diffraction grating devices of the third and fourth design examples, the amplitude distribution Δn(z) of the refractive index modulation is 0 at each phase inversion portion.

As described above, in the diffraction grating devices of the second to fourth design examples, the amplitude distribution Δn(z) of the refractive index modulation is set to 0 at each phase inversion portion whereby the side lobe in the transmission wavelength band can be reduced while maintaining the flat reflectance characteristic in the reflection wavelength band. Even in the above-described diffraction grating device whose amplitude distribution Δn(z) of the refractive index modulation is represented by a sinc function, the amplitude distribution Δn(z) of the refractive index modulation is 0 at each phase inversion portion, and the side lobe in the transmission wavelength band can be reduced while maintaining the flat reflectance in the reflection wavelength band.

Figure 15A:
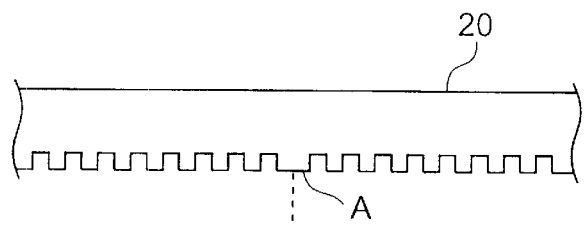
FIGS. 15A and 15B are views for explaining a method of manufacturing a diffraction grating device having phase inversion portions and, more specifically.
Figure 15B:
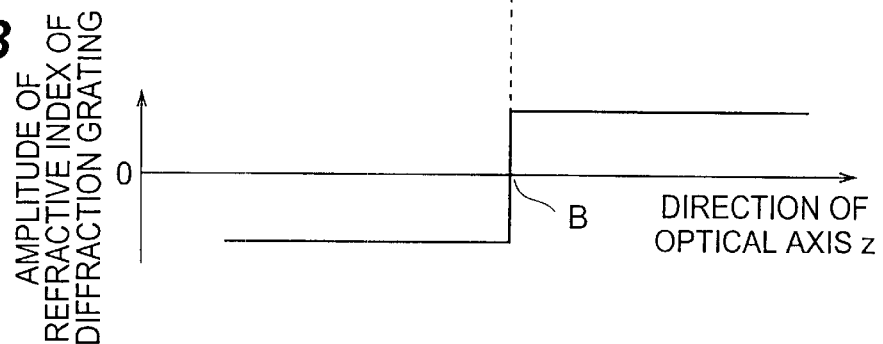

To manufacture the diffraction grating device of the first design example, a phase grating mask 20 as shown in FIG. 15A is used. FIGS. 15A and 15B are views for explaining the method of manufacturing a diffraction grating device having phase inversion portions. A phase grating mask normally used has one periodically three-dimensional surface. In the phase grating mask 20 used to manufacture a diffraction grating device having phase inversion portions, the period of three-dimensional pattern is shifted at a point A. To manufacture the diffraction grating device of the first design example, interference fringes are formed on an optical fiber based on silica glass and having a core region doped with $GeO_2$ by irradiating the optical fiber with UV light (e.g., excimer laser beam) through the phase grating mask 20, and a refractive index distribution is formed in correspondence with the intensity distribution of the interference fringes. Alternatively, a refractive index modulation having a predetermined period and no phase inversion portions is formed using a normal phase grating mask having a periodically three-dimensional surface, and a portion where a phase inversion portion of the diffraction grating device is to be formed is irradiated with UV light to increase the refractive index and change the optical length at the phase inversion portion by an odd multiple of $\lambda_b/4$. At this time, the refractive index amplitude of the diffraction grating device is inverted at a phase inversion portion B, as shown in FIG. 15B.

On the other hand, to manufacture the diffraction grating device of the third or fourth design example, two types of normal phase grating masks each having a periodically three-dimensional surface are used. The two types of phase grating masks have slightly different three-dimensional periods. Let $\Lambda_0+\Delta\Lambda$ be the period of the first refractive index modulation formed by the first phase grating mask, and $\Lambda_0-\Delta\Lambda$ be the period of the second refractive index modulation formed by the second phase grating mask. The amplitude distributions of the first and second refractive index modulations are kept constant and made equal to each other. The first and second refractive index modulations are formed to overlap in the same region in the longitudinal direction of an optical fiber such that the refractive index modulations have slightly different origins.

The refractive index distribution n(z) of the whole refractive index modulation formed by overlapping the first and second refractive index modulations is given by $$n(z) = n_0 + \frac{\Delta n_0}{2}\left\{\cos\left(\frac{2\pi(z+\Delta z)}{\Lambda_0+\Delta\Lambda}\right) + \cos\left(\frac{2\pi(z-\Delta z)}{\Lambda_0-\Delta\Lambda}\right)\right\} \quad (27)$$

When $\Delta\Lambda$ is much smaller than $\Lambda_0$, equation (27) can be approximated to $$n(z) \approx n_0 + \Delta n_0 \cdot \cos\left(\frac{2\pi z}{\Lambda_0}\right) \cdot \cos\left(\frac{2\pi}{\Lambda_0}\left(\frac{\Delta\Lambda}{\Lambda_0}z - \Delta z\right)\right) \quad (28)$$

The second term of equation (28) is represented by the product of two cos functions. One cos function represents a fine refractive index modulation having the period $\Lambda_0$, and the other cos function represents the amplitude distribution of the refractive index modulation. As described above, when $\Delta\Lambda$ and $\Delta z$ are appropriately designed, a diffraction grating device having the amplitude distribution Δn(z) of the refractive index modulation represented by a cos function can be manufactured.

Figure 16A:
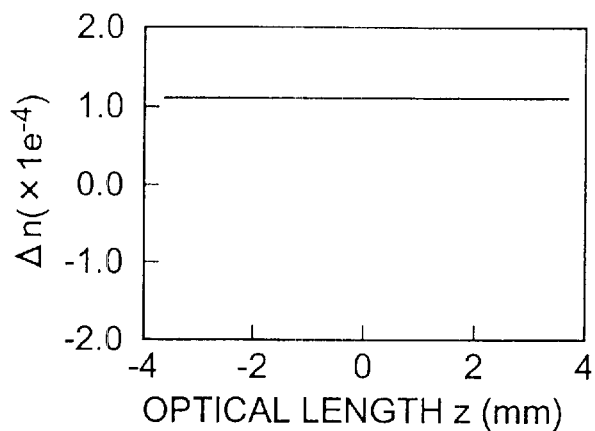
FIGS. 16A to 16D are graphs for explaining the fifth design example of the diffraction grating device according to the first embodiment and, more specifically, in the fifth design example.
Figure 16B:
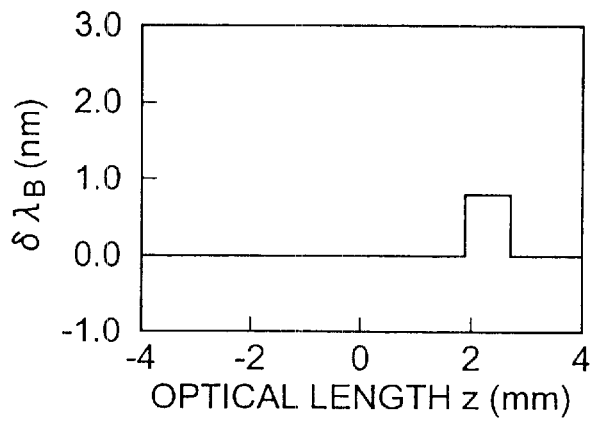
Figure 16C:
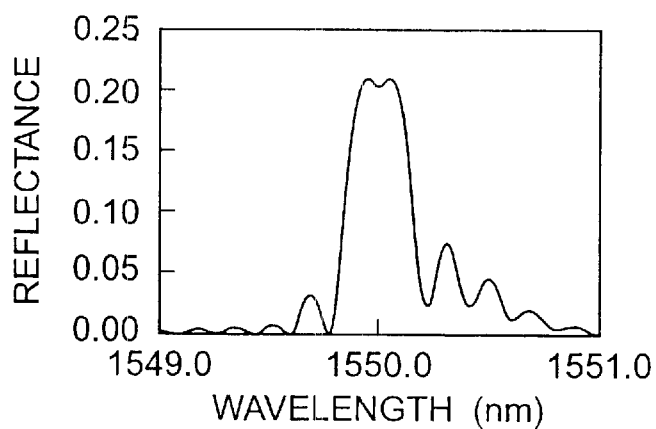
Figure 16D:
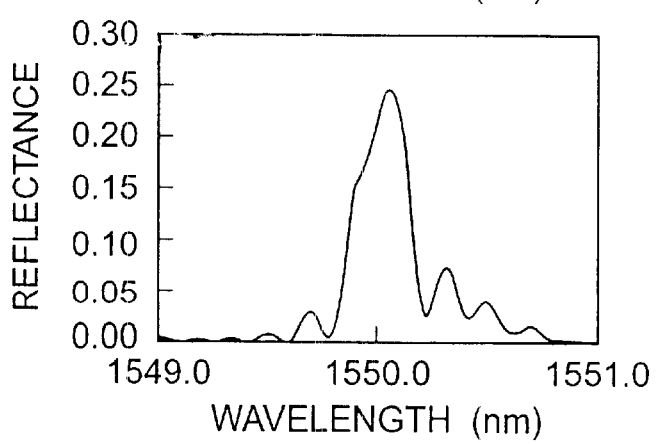

A diffraction grating device that realizes phase inversion by partially increasing the refractive index in the refractive index modulation formation region will be described next. FIGS. 16A to 16D are graphs for explaining the fifth design example of the diffraction grating device according to the first embodiment. FIG. 16A shows the amplitude distribution Δn(z) of the refractive index modulation, FIG. 16B shows the diffraction wavelength shift distribution $\delta\lambda_B(z)$ from the central diffraction wavelength $\lambda_B$, FIG. 16C shows the reflection spectrum, and FIG. 16D shows the reflection spectrum when the phase change amount is set to π in the region of a phase inversion portion.

In the diffraction grating device of the fifth design example, the amplitude distribution Δn(z) of the refractive index modulation is constant in the longitudinal direction (FIG. 16A), the period Λ(z) of the refractive index modulation is also constant in the longitudinal direction, and the refractive index is increased in a partial region (optical length: 0.88 mm) in the longitudinal direction to increase the diffraction wavelength shift $\delta\lambda_B(z)$ from the central diffraction wavelength $\lambda_B$ in that region (FIG. 16B). More preferably, the phase is inverted in a shorter region (about 1/10 or less of 0.88 mm).

In such a diffraction grating device, since the refractive index modulation is formed even in the region of the phase inversion portion, and the optical period in the region of the phase inversion portion is different from that in the remaining region, the reflection spectrum is disturbed, and the reflectance characteristic in the reflection wavelength band is not flat (FIG. 16D). However, in the diffraction grating device of the fifth design example, the reflectance characteristic in the reflection wavelength band is flattened by setting the phase change amount at the phase inversion portion to 1.16π (FIG. 16C). That is, when the region of the phase inversion portion due to a change in optical length is long, the phase change amount in that region is appropriately adjusted, thereby implementing a diffraction grating device having a flat reflectance characteristic in the reflection wavelength band.

To manufacture a diffraction grating device like the fifth design example, the phase inversion portion is irradiated with UV light while monitoring the reflection spectrum, and UV irradiation is ended when a desired reflection spectrum is obtained. For the diffraction grating device of the fifth design example, the reflectance characteristic in the reflection wavelength band can be flattened either by shortening the region of the phase inversion portion that disturbs the reflection spectrum or nullifying the refractive index modulation amplitude in the region of the phase inversion portion.

The above-described diffraction grating device according to the first embodiment will be summarized below. The diffraction grating device according to the first embodiment is a diffraction grating device having a refractive index modulation formed in the optical waveguide region in a predetermined region in the longitudinal direction of an optical waveguide. The optical period of the refractive index modulation is constant, the phase of the refractive index modulation is inverted at a phase inversion portion, and the number of phase inversion portions is one or two. In addition, the diffraction grating device according to the first embodiment satisfies inequality (25) for the parameter R (equation (22a)).

The diffraction grating device according to the first embodiment, which satisfies the above conditions, can shorten the region where the refractive index modulation is formed (to about 10 mm or less) and flatten the reflectance characteristic in the reflection wavelength band. Hence, in this diffraction grating device, assembly for temperature adjustment or tension application is easy, and the reflection spectrum of the diffraction grating device can easily be kept constant when the temperature varies.

Second Embodiment

A diffraction grating device according to the second embodiment of the present invention will be described next. In the diffraction grating device according to the second embodiment, each of the amplitude distribution $\Delta n(z)$ of the refractive index modulation and the phase shift distribution $\Delta\theta(z)$ is represented by an even function (symmetrical with respect to the central position z=0).

In this embodiment, since both the amplitude distribution $\Delta n(z)$ of the refractive index modulation and the phase shift distribution $\delta\theta(z)$ are represented by even functions, a parameter $A_{1C}$, (equation (16c)) and parameter $A_{1S}$ (equation (16d)) are 0. Hence, equation (17a) always holds, and equation (17b) is rewritten to $$A_{0C} \cdot A_{2C} + A_{0S} \cdot A_{2S} = 0 \quad (29)$$

When equation (29) holds, in a diffraction grating device having a low reflectance in the reflection wavelength band, the curvature of the reflection spectrum at a central diffraction wavelength $\lambda_B$ becomes 0.

In this embodiment as well, the left-hand side (curvature) of equation (29) is divided by the reflectance $(A_{0C}^2 + A_{0S}^2)$ at the central diffraction wavelength $\lambda_B$ and thus normalized. The division result is defined as a normalized curvature. The normalized curvature is further divided by a normalized curvature $(B_2/B_0)$ when no phase shift distribution is present and thus normalized. This division result is represented by a parameter R. That is, the parameter R is given by $$R = \frac{(A_{0c} \cdot A_{2c} + A_{0s} \cdot A_{2s}) \cdot B_0}{(A_{0c}^2 + A_{0s}^2) \cdot B_2} \quad (30)$$

As in the first embodiment, reflection spectra were obtained by changing the parameter R to various values. In this embodiment as well, to flatten the reflectance characteristic in the reflection wavelength band, a condition given by $$|R| < 0.25 \quad (31)$$

needs to be satisfied.

The diffraction grating device according to the first embodiment has one or two phase inversion portions. The diffraction grating device according to the second embodiment has no phase inversion portion, and the phase shift distribution $\delta\theta(z)$ of the refractive index modulation is represented by an even and continues function. In the diffraction grating device according to the second embodiment, which has no phase inversion portion, the phase shift distribution $\delta\theta(z)$ of the refractive index modulation must satisfy a condition given by $$|\delta\theta(z) - \delta\theta(0)| < 2\pi \quad (32)$$

In the diffraction grating device described in reference 2 of prior art, the amplitude distribution of the refractive index modulation is represented by a tanh function, and the period of the refractive index modulation is changed in the longitudinal direction, so inequality (31) can be satisfied. However, in this conventional diffraction grating device, $|\delta\theta(z) - \delta\theta(0)|$ is about $20\pi$ and does not satisfy inequality (32). To the contrary, the diffraction grating device according to the second embodiment can shorten the region where the refractive index modulation is formed while maintaining the flatness of reflectance characteristic in the reflection wavelength band by satisfying inequality (32).

Figure 17A:
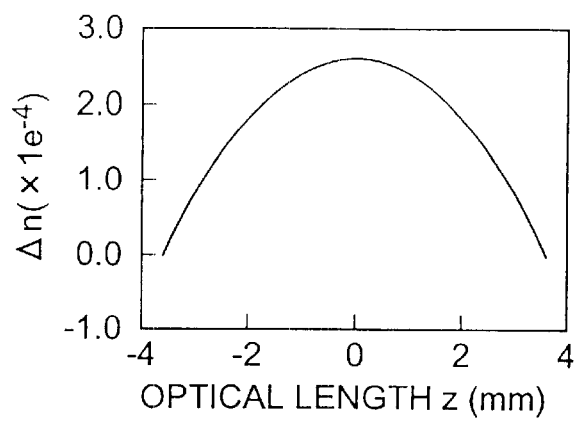
FIGS. 17A to 17D are graphs for explaining the sixth design example of the diffraction grating device according to the second embodiment.
Figure 17B:
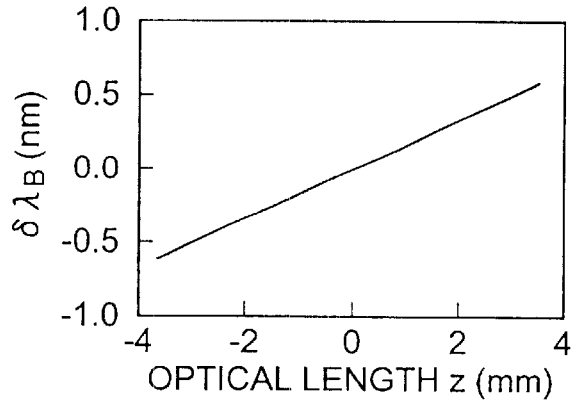
Figure 17C:
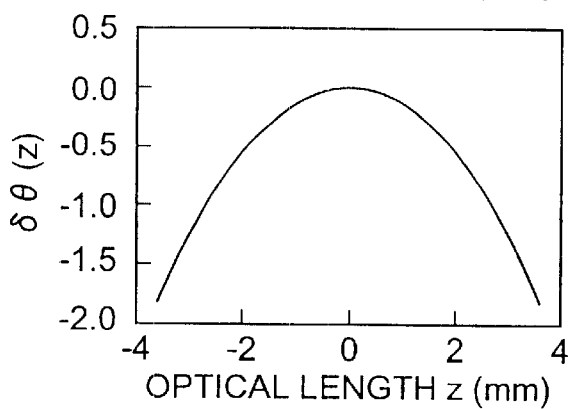
Figure 17D:
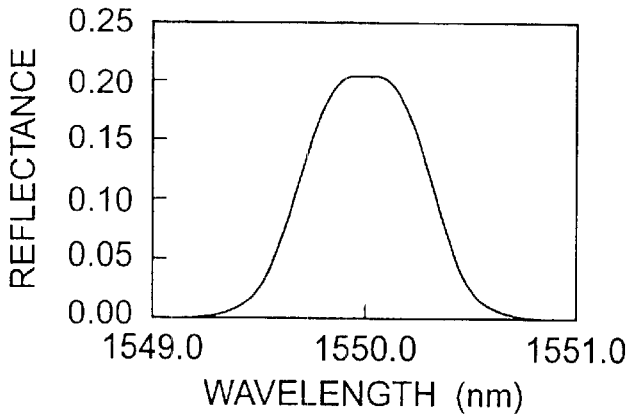
Figure 18A:
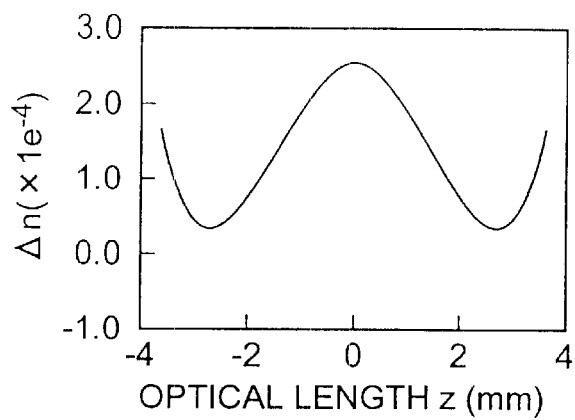
FIGS. 18A to 18D are graphs for explaining the seventh design example of the diffraction grating device according to the second embodiment.
Figure 18B:
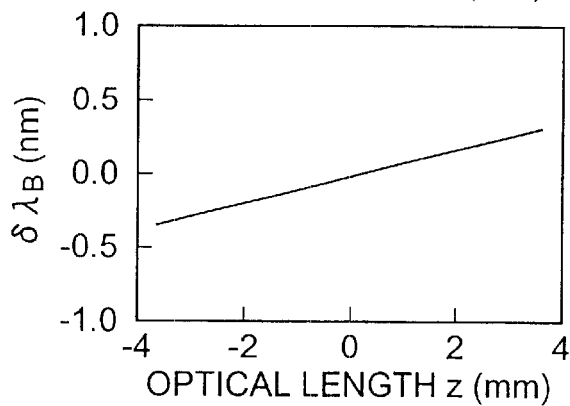
Figure 18C:
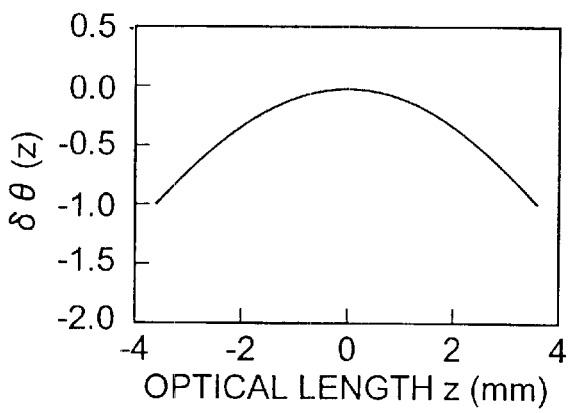
Figure 18D:
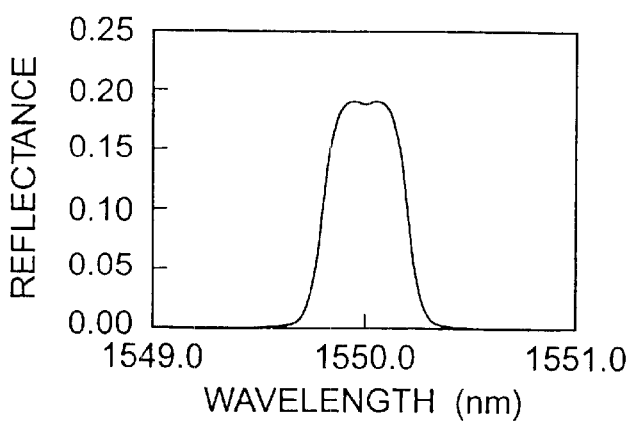
Figure 19A:
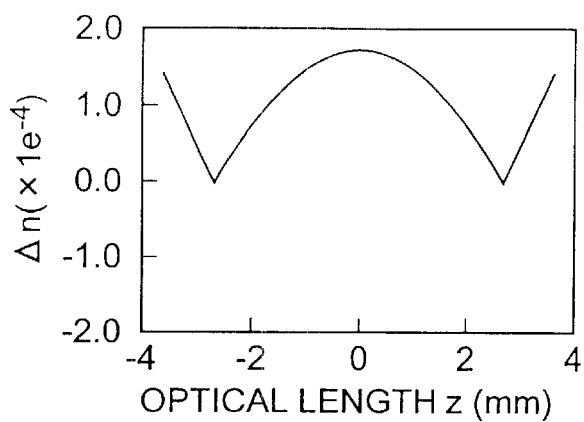
FIGS. 19A to 19D are graphs for explaining the eighth design example of the diffraction grating device according to the second embodiment and, more specifically, in the sixth to eighth design examples.
Figure 19B:
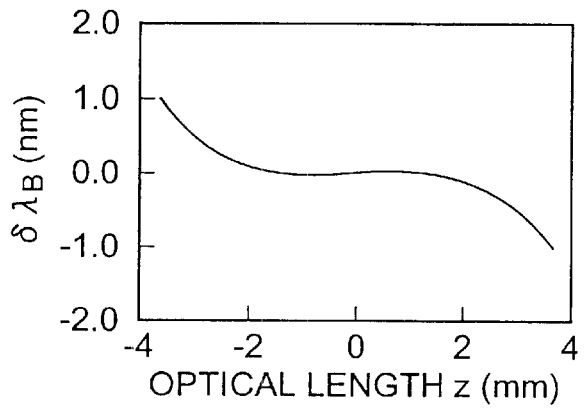
Figure 19C:
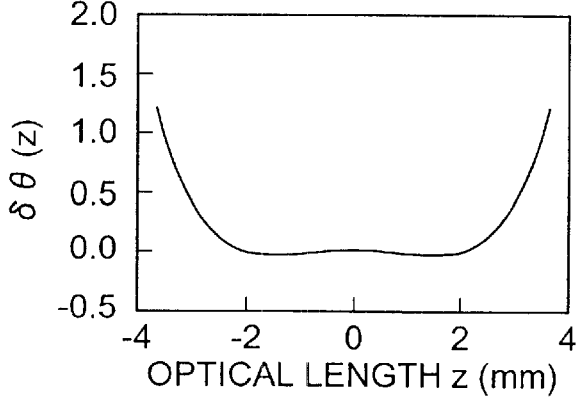
Figure 19D:
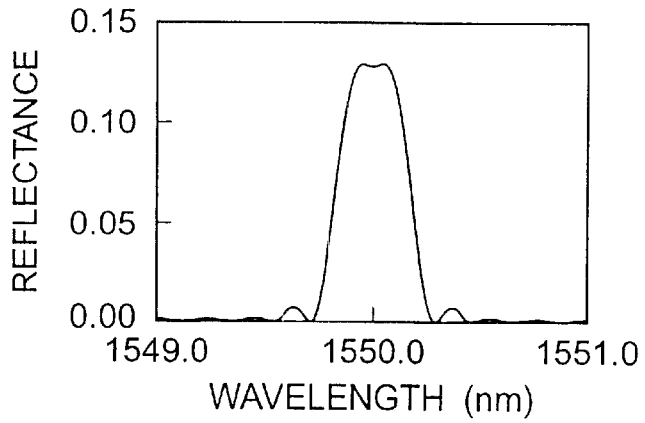

Detailed design examples of the diffraction grating device according to this embodiment will be described below. FIGS. 17A to 17D are graphs for explaining the sixth design example of the diffraction grating device according to the second embodiment, FIGS. 18A to 18D are graphs for explaining the seventh design example of the diffraction grating device according to this embodiment, and FIGS. 19A to 19D are graphs for explaining the eighth design example of the diffraction grating device according to this embodiment. FIGS. 17A, 18A, and 19A show the amplitude distributions $\Delta n(z)$ of the refractive index modulations, FIGS. 17B, 18B, and 19B show the diffraction wavelength shift distributions $\delta\lambda_B(z)$ from the central diffraction wavelength $\lambda_B$, FIGS. 17C, 18C, and 19C show the phase shift distributions $\delta\lambda_B(z)$ of the refractive index modulations, and FIGS. 17D, 18D, and 19D show the reflection spectra. The phase shift distribution $\delta\theta(z)$ and diffraction wavelength shift distribution $\delta\lambda_B(z)$ have a relationship given by $$\delta\theta(z) = -\frac{4\pi}{\lambda_B^2} \int \delta\lambda_B(z) dz \quad (33)$$

For the diffraction grating device of each design example, the amplitude distribution $\Delta n(z)$ of the refractive index modulation is represented by an even function, as shown in FIGS. 17A, 18A, and 19A, and the phase shift distribution $\delta\theta(z)$ of the refractive index modulation is represented by an even and continuos function, as shown in FIGS. 17C, 18C, and 19C. In addition, for the diffraction grating device of each design example, the reflectance characteristic is almost flat in the reflection wavelength band, and the reflection spectrum exhibits a concave shape with a low reflectance at the central diffraction wavelength $\lambda_B$, thereby increasing the reflection wavelength bandwidth, as shown in FIGS. 17D, 18D and 19D.

In the sixth and seventh design examples, the diffraction wavelength shift distribution $\delta\lambda_B(z)$ from the central diffraction wavelength $\lambda_B$ is represented by the linear equation of a variable z. However, in the eighth design example, the distribution $\delta\lambda_B(z)$ is represented by a cubic equation of the variable z. In the sixth design example, the amplitude distribution $\Delta n(z)$ of the refractive index modulation has no minimal point. However, in the seventh and eighth design examples, the amplitude distribution $\Delta n(z)$ has two minimal points. The reflection spectra will be compared. In the sixth design example, the change in reflectance is not always steep near the boundary between the reflection wavelength band and the transmission wavelength band. However, in the seventh and eighth design examples, the change in reflectance near the boundary is steep.

As described above, in this embodiment, since the amplitude distribution $\Delta n(z)$ of the refractive index modulation has two minimal points, the change in reflectance can be made steep near the boundary between the reflection wavelength band and the transmission wavelength band. This is because when the value of the amplitude distribution $\Delta n(z)$ of the refractive index modulation is decreased between the position where the phase shift distribution $\delta\theta(z)$ of the refractive index modulation is 0 and the position where the phase shift distribution $\delta\theta(z)$ is $\pi$, the effect of the phase shift distribution $\delta\theta(z)$ of the refractive index modulation, which is 0 or $\pi$, can be increased, and the arrangement can be similar to the diffraction grating device of the first embodiment having a phase inversion portion.

To obtain a desired diffraction wavelength shift distribution $\delta\lambda_B(z)$ from the central diffraction wavelength $\lambda_B$, one or both the average refractive index distribution $n_0(z)$ and refractive index modulation period distribution $\Lambda(z)$ need to be appropriately designed. To obtain a desired average refractive index distribution $n_0(z)$, a refractive index modulation is formed on an optical fiber using a phase grating mask, and the optical fiber is irradiated with UV light without using the phase grating mask at an irradiation intensity or for an irradiation time corresponding to each position. To obtain a desired refractive index modulation period distribution $\Lambda(z)$, a phase grating mask having a three-dimensional distribution corresponding to the distribution $\Lambda(z)$ is used.

The above-described diffraction grating device according to the second embodiment will be summarized below. The diffraction grating device according to the second embodiment is a diffraction grating device having a refractive index modulation formed in the optical waveguide region in a predetermined region in the longitudinal direction of an optical waveguide. The amplitude distribution $\Delta n(z)$ of the refractive index modulation is represented by an even function, and the phase shift distribution $\delta\theta(z)$ of the refractive index modulation is represented by an even and continuous function. In addition, the diffraction grating device according to the second embodiment satisfies inequality (31) for the parameter R (equation (30)) and inequality (32).

The diffraction grating device according to the second embodiment, which satisfies the above conditions, can shorten the region where the refractive index modulation is formed (to about 10 mm or less) and flatten the reflectance in the reflection wavelength band. Hence, in this diffraction grating device, assembly for temperature adjustment or tension application is easy, and the reflection spectrum of the diffraction grating device can easily be kept constant when the temperature varies.

As has been described above in detail, the above-described diffraction grating device according to the present invention is a diffraction grating device having a refractive index modulation formed in the optical waveguide region in a predetermined region in the longitudinal direction of an optical waveguide, in which the optical period of the refractive index modulation is constant, the phase of the refractive index modulation is inverted at a phase inversion portion, the number of phase inversion portions present in the predetermined region is one or two, and inequality (8) holds for the parameters $A_0$, $A_2$, $B_0$, and $B_2$ obtained by integral calculations of equations (7a) to (7d) in the predetermined region.

The diffraction grating device according to the present invention, which satisfies the above conditions, can shorten the region where the refractive index modulation is formed (to about 10 mm or less) and flatten the reflectance characteristic in the reflection wavelength band. Hence, in this diffraction grating device, assembly for temperature adjustment or tension application is easy, and the reflection spectrum of the diffraction grating device can easily be kept constant when the temperature varies.

In the present invention, when the amplitude distribution $\Delta n(z)$ of the refractive index modulation is 0 at the phase inversion portion, the side lobe in the transmission wavelength band can be reduced while maintaining a flat reflectance in the reflection wavelength band.

In the present invention, when the average refractive index is constant in the predetermined region, and the amplitude distribution $\Delta n(z)$ of the refractive index modulation is represented by a cos function, a diffraction grating device can easily be manufactured using two types of normal phase grating masks each having a periodically three-dimensional surface.

In addition, the diffraction grating device according to the present invention is a diffraction grating device having a refractive index modulation formed in the optical waveguide region in a predetermined region in the longitudinal direction of an optical waveguide, in which the amplitude distribution $\Delta n(z)$ of the refractive index modulation is represented by an even function, the phase shift distribution $\delta\theta(z)$ of the refractive index modulation is represented by an even and continuous function, inequality (10) holds for the parameters $A_{0C}$, $A_{0S}$, $A_{2C}$, $A_{2S}$, $B_0$, and $B_2$ obtained by integral calculations of equations (9a) to (9f) in the predetermined region, and inequality (11) holds in the predetermined region.

The diffraction grating device according to the present invention, which satisfies the above conditions, can shorten the region where the refractive index modulation is formed (to about 10 mm or less) and flatten the reflectance characteristic in the reflection wavelength band. Hence, in this diffraction grating device, assembly for temperature adjustment or tension application is easy, and the reflection spectrum of the diffraction grating device can easily be kept constant when the temperature varies.

In the present invention, when the amplitude distribution $\Delta n(z)$ of the refractive index modulation has two minimal points of absolute value in the predetermined region, the change in reflectance can be made steep near the boundary between the reflection wavelength band and the transmission wavelength band.

As is apparent from the above description, various changes and modifications can be made for the present invention. Such changes and modifications are made without departing from the spirit and scope of the present invention, and it is understood by those who are skilled in the part that the improvements are included in the appended claims.

What is claimed is:

1. A diffraction grating device having a refractive index modulation formed in an optical waveguide region in a predetermined region in a longitudinal direction of an optical waveguide, wherein an optical period of the refractive index modulation is substantially constant, a phase of the refractive index modulation is inverted at a phase inversion portion, the number of phase inversion portions present in the predetermined region is one or two, and when z is a variable representing a position in the longitudinal direction using a barycentric position of the predetermined region as an origin, that is, z is an optical distance from the origin, $\Delta n(z)$ is an amplitude distribution of the refractive index modulation, and a sign of the amplitude distribution $\Delta n(z)$ is changed at the phase inversion portion, parameters $A_0$, $A_2$, $B_0$, and $B_2$ obtained by integral calculations in the predetermined region are given by $$A_0 = \int \Delta n(z) dz$$

$$A_2 = \int z^2 \cdot \Delta n(z) dz$$

$$B_0 = \int |\Delta n(z)| dz$$

$$B_2 = \int z^2 \cdot |\Delta n(z)| dz$$

and for the parameters $A_0$, $A_2$, $B_0$, and $B_2$, a condition given by $$\left| \frac{A_2 \cdot B_0}{A_0 \cdot B_2} \right| < 0.25$$

holds.

2. A diffraction grating device according to claim 1, wherein the amplitude distribution $\Delta n(z)$ of the refractive index modulation is 0 at the phase inversion portion.

3. A diffraction grating device according to claim 1, wherein an average refractive index is constant in the predetermined region, and the amplitude distribution $\Delta n(z)$ of the refractive index modulation is represented by a cos function.

4. A diffraction grating device having a refractive index modulation formed in an optical waveguide region in a predetermined region in a longitudinal direction of an optical waveguide, wherein, when z is a variable representing a position in the longitudinal direction using a central position of the predetermined region as an origin, that is, z is an optical distance from the origin, $\Delta n(z)$ is an amplitude distribution of the refractive index modulation, and $\delta\theta(z)$ is a phase shift distribution of the refractive index modulation with reference to a period defined from a central diffraction wavelength, the amplitude distribution $\Delta n(z)$ of the refractive index modulation is represented by an even function, the phase shift distribution $\delta\theta(z)$ of the refractive index modulation is represented by an even and continuous function, and parameters $A_{0C}$, $A_{0S}$, $A_{2C}$, $A_{2S}$, $B_0$, and $B_2$ obtained by integral calculations in the predetermined region are given by $$A_{0C} = \int \Delta n(z) \cdot \cos(\delta\theta(z)) dz$$

$$A_{0S} = \int \Delta n(z) \cdot \sin(\delta\theta(z)) dz$$

$$A_{2C} = \int z^2 \cdot \Delta n(z) \cdot \cos(\delta\theta(z)) dz$$

$$A_{2S} = \int z^2 \cdot \Delta n(z) \cdot \sin(\delta\theta(z)) dz$$

$$B_0 = \int \Delta n(z) dz$$

$$B_2 = \int z^2 \cdot \Delta n(z) dz$$

for the parameters $A_{0C}$, $A_{0S}$, $A_{2C}$, $A_{2S}$, $B_0$, and $B_2$, a condition given by $$\left| \frac{(A_{0c} \cdot A_{2c} + A_{0s} \cdot A_{2s}) \cdot B_0}{(A_{0c}^2 + A_{0s}^2) \cdot B_2} \right| < 0.25$$

holds, and a condition given by $$|\delta\theta(z) - \delta\theta(0)| < 290 \qquad (5)$$

holds in the predetermined region.

5. A diffraction grating device according to claim 4, wherein the amplitude distribution $\Delta n(z)$ of the refractive index modulation has two minimal points of absolute value in the predetermined region.

* * * * *